United States Patent
Chehanowitz et al.

(10) Patent No.: US 11,606,770 B2
(45) Date of Patent: Mar. 14, 2023

(54) SYSTEM, METHOD, AND COMPUTER PROGRAM FOR USING MOVING NETWORK CONNECTED VEHICLES TO DELIVER HIGH LEVEL CONNECTIVITY

(71) Applicant: Amdocs Development Limited, Limassol (CY)

(72) Inventors: Sarit Chehanowitz, Tel Aviv (IL); Liat Taub Bahar, Kfar Sabba (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 44 days.

(21) Appl. No.: 17/083,131

(22) Filed: Oct. 28, 2020

(65) Prior Publication Data

US 2022/0132457 A1 Apr. 28, 2022

(51) Int. Cl.
*H04W 64/00* (2009.01)
*H04W 4/40* (2018.01)
*H04W 84/00* (2009.01)

(52) U.S. Cl.
CPC ............ *H04W 64/00* (2013.01); *H04W 4/40* (2018.02); *H04W 84/005* (2013.01)

(58) Field of Classification Search
None
See application file for complete search history.

(56) References Cited

U.S. PATENT DOCUMENTS

| | | | |
|---|---|---|---|
| 7,801,540 | B2 | 9/2010 | Jamali et al. |
| 2005/0058112 | A1* | 3/2005 | Lahey ................. H04L 41/5067 370/338 |
| 2009/0054058 | A1* | 2/2009 | Andreasson ............ H04W 4/18 455/426.1 |
| 2012/0113838 | A1* | 5/2012 | Lim .................... H04B 7/15507 370/252 |
| 2014/0086225 | A1* | 3/2014 | Jung ..................... H04W 12/06 370/338 |

(Continued)

OTHER PUBLICATIONS

Snyder, B., "5G could require cell towers on every street corner," Consumer tech radar, CIO, Sep. 8, 2016, 4 pages, retrieved from https://www.cio.com/article/3117705/5g-could-require-cell-towers-on-every-street-corner.html.

(Continued)

*Primary Examiner* — Ernest G Tacsik
(74) *Attorney, Agent, or Firm* — Zilka-Kotab, P.C.

(57) ABSTRACT

As described herein, a system, method, and computer program are provided for using moving network connected vehicles to deliver high level network connectivity. In use, a request for digital content to be provided to a requesting device is received, the requesting device being a residential network router or a mobile device of a user. Additionally, responsive to the request, one or more moving network connected vehicles available to obtain the digital content when moving in a vicinity of a network and to provide the digital content to the requesting device when moving in a vicinity of the requesting device are determined. Further, the one or more moving network connected vehicles are caused to obtain the digital content when moving in the vicinity of the network and to provide the digital content to the requesting device when moving in the vicinity of the requesting device.

16 Claims, 6 Drawing Sheets

(56) References Cited

U.S. PATENT DOCUMENTS

| | | | | |
|---|---|---|---|---|
| 2014/0187267 | A1* | 7/2014 | Yang | H04W 4/80 |
| | | | | 455/456.3 |
| 2015/0236778 | A1 | 8/2015 | Jalali | |
| 2016/0242141 | A1* | 8/2016 | Lin | H04W 72/0453 |
| 2017/0013476 | A1* | 1/2017 | Suthar | H04W 4/30 |
| 2017/0257779 | A1 | 9/2017 | Zerick et al. | |
| 2018/0281612 | A1* | 10/2018 | Perry | B60L 53/63 |
| 2018/0367973 | A1* | 12/2018 | Bloechl | H04W 4/80 |
| 2018/0368206 | A1* | 12/2018 | Wohler | H04L 41/0816 |
| 2019/0052914 | A1 | 2/2019 | Anderson | |
| 2019/0387455 | A1* | 12/2019 | Zavesky | H04W 4/029 |
| 2020/0107186 | A1* | 4/2020 | Park | H04W 4/40 |
| 2020/0229065 | A1* | 7/2020 | Iwata | H04W 4/44 |

OTHER PUBLICATIONS

Wikipedia, "Connected car," Wikipedia, 2020, 10 pages, retrieved from https://en.wikipedia.org/wiki/Connected_car.

Wikipedia, "Inverse multiplexer," Wikipedia, 2019, 2 pages, retrieved from https://en.wikipedia.org/wiki/Inverse_multiplexer.

International Search Report and Written Opinion from PCT Application PCT/IB2021/059100, dated Jan. 18, 2022.

* cited by examiner

US 11,606,770 B2

SYSTEM, METHOD, AND COMPUTER PROGRAM FOR USING MOVING NETWORK CONNECTED VEHICLES TO DELIVER HIGH LEVEL CONNECTIVITY

FIELD OF THE INVENTION

The present invention relates to configuration of edges in a network.

BACKGROUND

Network connectivity for a user device significantly depends on the coverage of the network with respect to the location of the user device. Network coverage is available for a particular location when a network tower is within a vicinity of the location to enable communication between the network and the user device via antennas and electronic communications equipment located on the tower.

Thus, while some areas may have great connectivity (such as 5G network connectivity), others may have less of a connectivity, dependent on the available network coverage for the area. The difference could be a factor of 10 or 100. Because of technology, the coverage is expected to be very partial. 5G in particular is expected to be partial because, while being faster, it requires a much denser network. For example, an isolated house (e.g. outside of a city/town) will not have 5G connectivity available unless it has its own tower. Since many people don't want to have a tower next to their house, network coverage may be unavailable.

There is thus a need for addressing these and/or other issues associated with the prior art.

SUMMARY

As described herein, a system, method, and computer program are provided for using moving network connected vehicles to deliver high level network connectivity. In use, a request for digital content to be provided to a requesting device is received, the requesting device being a residential network router or a mobile device of a user. Additionally, responsive to the request, one or more moving network connected vehicles available to obtain the digital content when moving in a vicinity of a network and to provide the digital content to the requesting device when moving in a vicinity of the requesting device are determined. Further, the one or more moving network connected vehicles are caused to obtain the digital content when moving in the vicinity of the network and to provide the digital content to the requesting device when moving in the vicinity of the requesting device.

DETAILED DESCRIPTION

Figure 1:
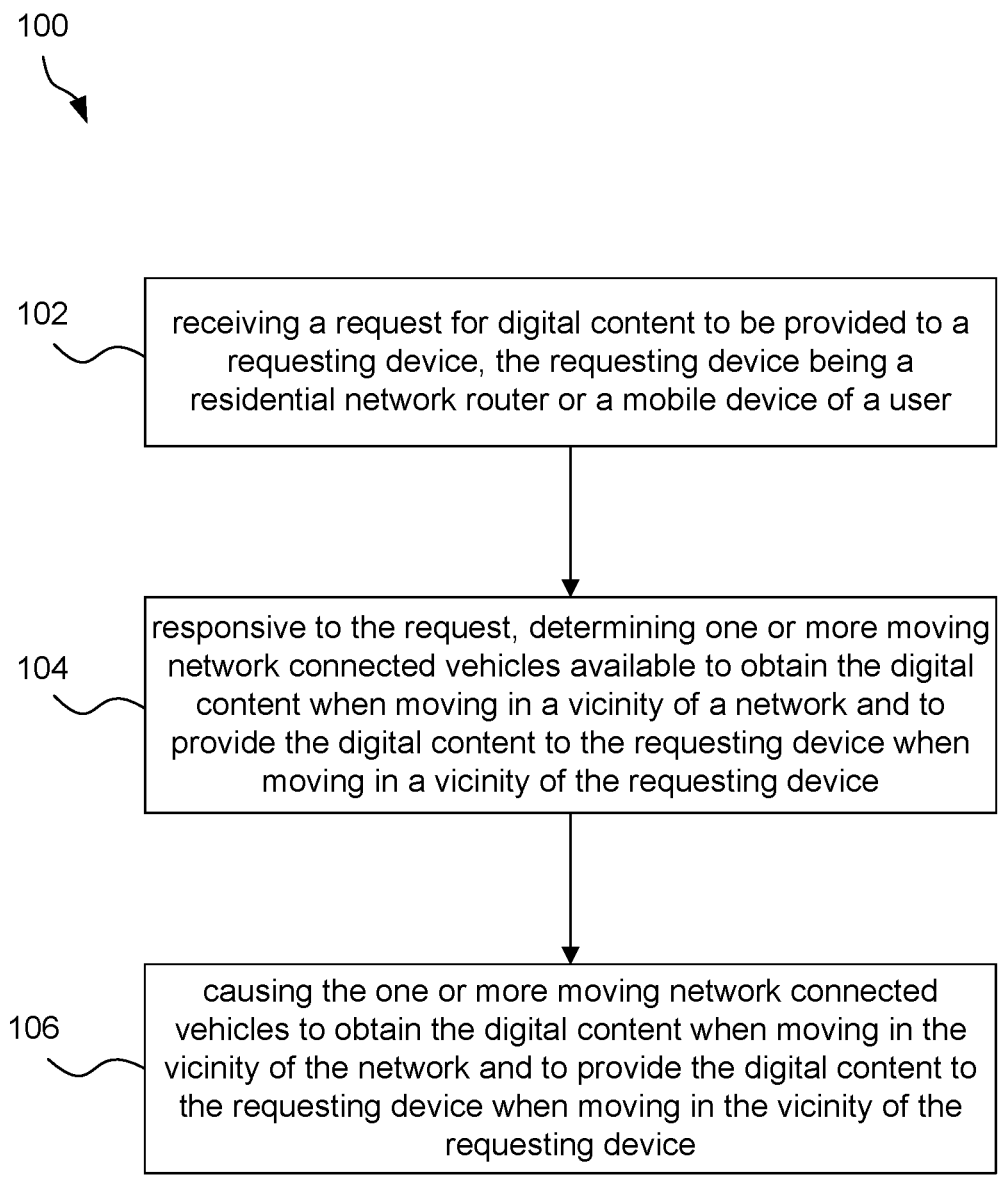
FIG. 1 illustrates a method for using moving network connected vehicles to deliver high level network connectivity, in accordance with one embodiment.

FIG. 1 illustrates a method 100 for using moving network connected vehicles to deliver high level network connectivity, in accordance with one embodiment. The method 100 may be carried out by a computer processing system, such as any of the computing devices described below with reference to FIGS. 5 and/or 6. For example, the method 100 may be carried out as a service of a communication service provider (CSP) or other network provider.

In operation 102, a request for digital content to be provided to a requesting device is received, the requesting device being a residential network router or a mobile device of a user. The residential network router is a router located in a home or business which provides network connectivity to network-enabled devices in and around the home or business, such as televisions, mobile phones, tablet, laptops, etc. However, the residential network router or mobile device of the user, while 5G enabled or configured for another type of network, may be located in a low connectivity area which prohibits or limits connectivity to the network.

In on embodiment, the request may be received from the requesting device. For example, the request may be received directly from the mobile device of the user, such as a television, mobile phone, tablet, laptop, etc. In another embodiment, the request may be received from the residential network router. In this case, the request may still be initiated at the mobile device of the user but transmitted through the residential network router.

As noted above, the request is for digital content to be provided to the requesting device. Thus, the request may indicate the digital content. The digital content may be a movie, website, or other content capable of being transmitted digitally to the requesting device. Optionally, the request may indicate a source of the digital content and/or a location of the requesting device.

In operation 104, one or more moving network connected vehicles available to obtain the digital content when moving in a vicinity of a network and to provide the digital content to the requesting device when moving in a vicinity of the requesting device are determined, responsive to the request. The moving network connected vehicles may be cars, trucks, or any other type of vehicle that moves and that is network connected (e.g. equipped with a network enabled computer system). The vicinity of the requesting device may refer to a predefined vicinity in which network communications are enabled with the requesting device. The vicinity of the network may refer to a predefined vicinity in which network communications are enabled with the particular network. In the context of the present description, the requesting device is not within the vicinity of the particular network, which provide higher broadband than a lower broadband network available in an area of the requesting device.

In one embodiment, determining one or more moving network connected vehicles may include using a navigation system to detect a plurality of moving network connected vehicles destined to be located within the vicinity of the network and at a later time within the vicinity of the requesting device. For example, the moving network connected vehicles may be those destined to be located within the vicinity of the network during a first defined time period and within the vicinity of the requesting device during a later defined time period. To this end, the one or more moving network connected vehicles may be anticipated to move in an area with a higher broadband coverage (e.g. 5G) than a lower broadband coverage available in an area of the requesting device.

In another embodiment, determining one or more moving network connected vehicles may include receiving an estimate from each moving network connected vehicle of the plurality of moving network connected vehicles of a size of data capable of being transmitted by the moving network connected vehicle to the requesting device when moving in the vicinity of the requesting device, and then evaluating the estimates received from the plurality of moving network connected vehicles to select the one or more moving network connected vehicles from the plurality of moving network connected vehicles. Each estimate may be based on a communication speed of the moving network connected vehicle, a communication speed of the requesting device, and/or a time duration in which the moving network connected vehicle is expected to be moving in the vicinity of the requesting device.

In yet another embodiment, determining one or more moving network connected vehicles may include making an agreement with the one or more (e.g. selected) moving network connected vehicles of the plurality of moving network connected vehicles to provide the digital content to the requesting device when moving in the vicinity of the requesting device. The agreement may include a confirmation that the one or more moving network connected vehicles will provide the digital content to the requesting device.

Further, in operation 106, the one or more moving network connected vehicles are caused to obtain the digital content when moving in the vicinity of the network and to provide the digital content to the requesting device when moving in the vicinity of the requesting device. As an option, the one or more moving network connected vehicles may be instructed to retrieve (e.g. download) the digital content when moving in the vicinity of the network. As another option, the network may be instructed to provide (e.g. download) the digital content to the one or more moving network connected vehicles when moving in the vicinity of the network. In an embodiment, the one or more moving network connected vehicles may be instructed to provide the digital content to the requesting device when moving in the vicinity of the requesting device.

In one exemplary embodiment, a single moving network connected vehicle may be determined to be available to obtain the digital content when moving in the vicinity of the network provide the digital content to the requesting device when moving in a vicinity of the requesting device are determined, responsive to the request. In this case, the single moving network connected vehicle may be caused to retrieve an entirety of the digital content from a digital content source when moving in the vicinity of the network (or the network caused to provide the entirety of the digital content to the single moving network connected vehicle when moving in the vicinity of the network) and to provide the entirety of the digital content to the requesting device when moving in the vicinity of the requesting device.

In another exemplary embodiment, two or more moving network connected vehicles may be determined to be available to obtain the digital content when moving in the vicinity of the network provide the digital content to the requesting device when moving in a vicinity of the requesting device.

In this case, each moving network connected vehicle of the two or more moving network connected vehicles may be caused to retrieve a respective portion of the digital content from a digital content source when moving in the vicinity of the network (or the network caused to provide respective portions of the digital content to the each of the moving network connected vehicles when moving in the vicinity of the network) and to provide the respective portion of the digital content to the requesting device. The respective portion to of the digital content to retrieve may be instructed to each moving network connected vehicle of the two or more moving network connected vehicles (or instructed to the network). The requesting device may then stitch together each respective portion of the digital content received from the two or more moving network connected vehicles to form the requested digital content.

As an option, the one or more moving network connected vehicles may obtain respective portions of the digital content from a digital content source via a plurality of different network stations within a current vicinity of the one or more moving network connected vehicles. For example, each of the moving network connected vehicles may be in the vicinity of a different network station (i.e. tower) at the time of retrieving its respective portion of the digital content, and thus may use the network station in its vicinity. As another example, as the vehicle moves from the vicinity of one network station to anther network station and so forth, the vehicle may obtain its respective portion of the digital content in subportions using the different network stations dependent on the network station within a current vicinity of the vehicle.

As another option, any one of the one or more moving network connected vehicles may provide its respective portion of the digital content to the requesting device via another one of the one or more moving network connected vehicles. This option may be useful where the vehicle is not in a vicinity of the requesting device long enough to transmit all of its respective portion of the digital content to the requesting device, in which case the other one of the moving network connected vehicles may aid the one of the moving network connected vehicles in providing its respective portion of the digital content to the requesting device. As a further option, causing the one or more moving network connected vehicles to provide the digital content to the requesting device may include instructing the one or more moving network connected vehicles to move at a speed that allows the one or more moving network connected vehicles to be within the vicinity of the requesting device for a period of time required to transmit the digital content to the requesting device.

To this end, the method 100 may enable a requesting device that itself is not within a coverage area of a desired network with high level network connectivity (e.g. 5G) to use moving network connected vehicles that are within the coverage area to obtain desired digital content via the desired network and then pass along that digital content to the requesting device via a local low level network connectivity available to the requesting device. As a result, the moving network connected vehicles may be used to obtain digital content via high level network connectivity and then provide the digital content to the requesting device.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

For many vehicles their route can be determined or predicted, including for car sharing, taxi, cars that use navigation, cargo fleets, most trucks, etc. For a device in a low connectivity area that wants to receive digital content (e.g. a movie), the system described herein can ask a car that moves through a high connectivity area to get some or all of the digital content, and then deliver the digital content to the device when the vehicle passes next to the device. Assume the peer to peer distance is 100 M so a car may travel 150 M in a vicinity of the requesting device. If it moves at 50 KM/h it will be within the vicinity for about 10 seconds. If the connectivity gap is 20 (i.e. 5G 20 times faster than the current rate of communication with the device) this means that the system can give the device 200 seconds, or three minutes, of media at the local rate. The system can employ multiple cars going on the road for the same digital content request so that downloading a movie may go down from hours to minutes if there is 5G in the area and enough vehicles acting as mobile edges for the device.

This assumes that many of the cars are what is referred to as connected vehicles. This means that they have good computing, good communication, and good storage. This is a trend that everyone assumes now will continue. While the car is configured to connect with the internet, it also has the equipment to connect locally to other cars.

Figure 2:
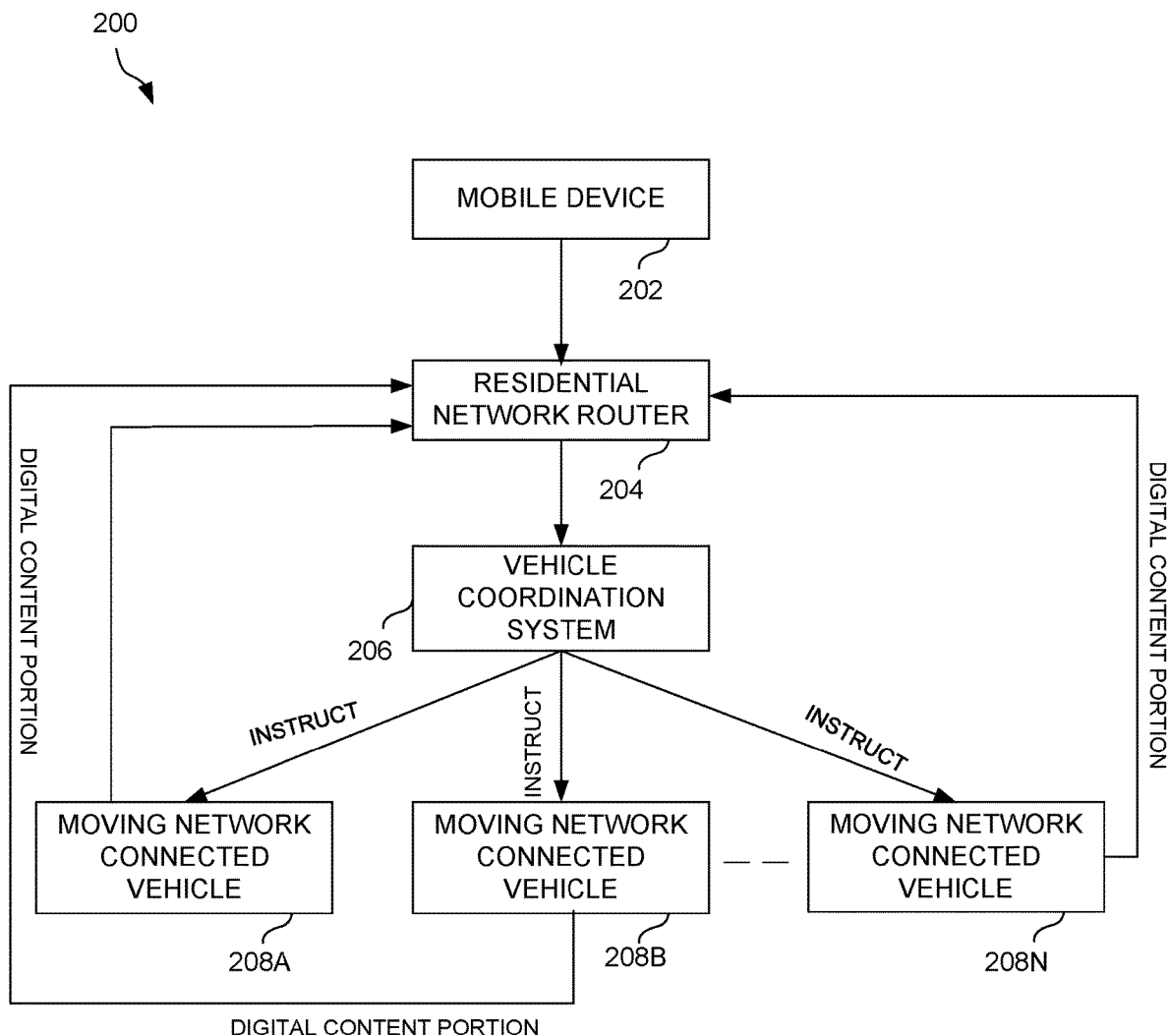
FIG. 2 illustrates a system that uses moving network connected vehicles to deliver high level network connectivity to a requesting device, in accordance with one embodiment.

FIG. 2 illustrates a system 200 that uses moving network connected vehicles to deliver high level network connectivity to a requesting device, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, a mobile device 202 of a user communicates with a residential network router 204 to request digital content. The residential network router 204 sends a request for the digital content to the vehicle coordination system 206. The vehicle coordination system 206 is in communication with the residential network router 204 via a first network (e.g. with low level network connectivity) and is in communication with moving network connected vehicles via a second network, in one embodiment.

Responsive to receipt of the request, the vehicle coordination system 206 determines one or more moving network connected vehicles 208A-N available to obtain the digital content when moving in the vicinity of a network and to provide the digital content to the requesting device when moving in a vicinity of the requesting device. For example, the vehicle coordination system 206 may use a navigation system to determine the moving network connected vehicles available to obtain the digital content when moving in the vicinity of a network and to provide the digital content to the requesting device. The vehicle coordination system 206 then communicates with the moving network connected vehicles 208A-N to cause them to obtain the digital content when moving in the vicinity of a network (or communicates with the network to provide the digital content to the moving network connected vehicles 208A-N when moving in the vicinity of the network) and to provide the digital content to the residential network router 204 when moving in the vicinity of the residential network router 204. Where the residential network router 204 receives multiple portions of the digital content from multiple different moving network connected vehicles 208A-N, the residential network router 204 may stitch the portions together to form the digital content and may then provide the digital content to the mobile device 202.

Figure 3:
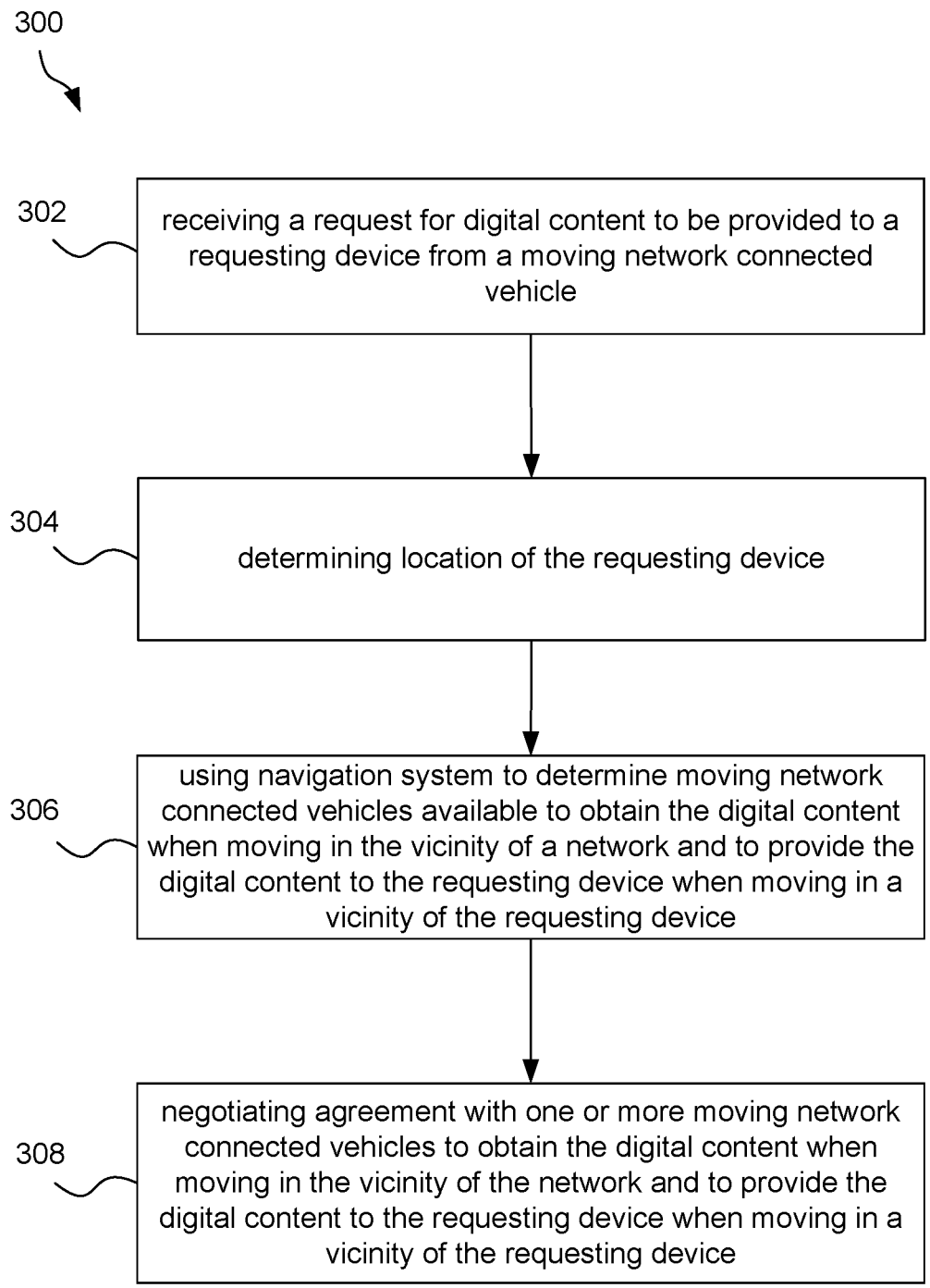
FIG. 3 illustrates a method for selecting moving network connected vehicles to deliver digital content to a requesting device, in accordance with one embodiment.

FIG. 3 illustrates a method 300 for selecting moving network connected vehicles to deliver digital content to a requesting device, in accordance with one embodiment. As an option, the method 300 may be carried out in the context of the details of the previous figure and/or any subsequent figure(s). For example, the method 300 may be carried out by the vehicle coordination system 206 of FIG. 2. Of course, however, the method 300 may be carried out in the context of any desired environment. Further, the aforementioned definitions may equally apply to the description below.

In operation 302, a request for digital content to be provided to a requesting device from a moving network connected vehicle is received. For example, the request may be received from the requesting device.

In operation 304, a location of the requesting device is determined. In one embodiment, the location may be indicated in the request. In another embodiment, a request for the location may be transmitted to the requesting device, in response to the receipt of the request for the digital content to be provided.

In operation 306, a navigation system is used to determine moving network connected vehicles available to obtain the digital content when moving in the vicinity of a network and to provide the digital content to the requesting device when moving in a vicinity of the requesting device. For example, the navigation system finds vehicles that will move in the near future within a coverage area of the network and that will later move next to the place (e.g. house) having the requesting device. The navigation system also estimates the time at which the vehicles will be in the vicinity of the network and the vicinity of the requesting device.

In operation 308, an agreement is negotiated with one or more of the moving network connected vehicles to provide the digital content to the requesting device when moving in a vicinity of the requesting device. In one embodiment, one or more of the moving network connected vehicles may agree to carry some amount of data for the requesting device. Optionally, a contract may be negotiated if micropayments are used. As another option, some credit may be given to an owner/driver/etc. of the vehicle instead of payment. The agreement may cause the one or more of the moving network connected vehicles to provide the digital content to the requesting device when moving in a vicinity of the requesting device.

Each of the vehicles may get an estimate of the size of data it could transfer depending on a minimum between the vehicle communication speed and the requesting device communication speed, with the minimum then multiplied by an expected time the vehicle will be within the vicinity of the requesting device. The vehicle may get the digital content (e.g. from the system), which may optionally be encrypted, before arriving in the vicinity of the requesting device. As the vehicle arrives within the vicinity of the requesting device, it communicates the digital content to the requesting device. The requesting device decrypts the digital content, if needed, and creates from it and the other vehicles sources the entire digital content it needed (e.g. by stitching together separately received portions of the digital content).

In an embodiment, the digital content is time sensitive. For example, for a movie, the requesting device may want the digital content on specific scenes to be delivered before those scenes on presented on the device. It is possible that some scenes will be received by the device with higher resolutions than others.

Vehicle to Vehicle Digital Content Transfer

Assume a vehicle can deliver the requesting device 300 M because that is what it can deliver during the time it is within the vicinity of the requesting device given the equipment the requesting device and the vehicle have. Assume the vehicle can upload 900 M while in 5G reception. One way to work it out is to deliver 300 M to the requesting device and then deliver portions of the digital content to the vehicles moving in the other direction, so that they will deliver those portions to the requesting device when passing by it. It may also deliver to vehicles next to it, if the bottleneck in the delivery was the vehicle equipment (i.e. when the requesting device can receive more than 300 M, but the vehicle cannot deliver more). However, as likely the requesting device will be the bottleneck (vehicles are expected to have very good communication equipment), in which case the vehicle needs to find another moving vehicle that will be in the vicinity of the requesting device when the vehicle itself is not vehicle. This could be vehicles on the other side of the road that the vehicle communicates with after passing the requesting device.

High Congestion Scenario

In venues where there is high congestion, the vehicles will constitute hot spots to be shared for any device that requires it. A high congestion venue may include an event (e.g. a concert). 5G may exist but it is not enough due to many data consumers in the area, and so each does not get the network connectivity level that it wants. Vehicles that move next to the event can add additional data for those in need.

Requiring Many Types of Connectivity—Control by the Residential Router

It is likely that the requesting device has multiple connectivity consumers, for example one person wants to see a movie and another wants to have a video conference. The residential router will give preference to the person requesting the video conference, as she needs low latency. The other person that does not care about latency but has a high broadband requirement (e.g. his movie is 3G) can get the data from the moving vehicles acting as network edges, thus reducing the overload and improving the video conference experience for the other person.

Helping Places that have Low Amount of Traffic

If vehicles are rarely in the vicinity of the requesting device, it may be desired to put more of the digital content, or multiple different digital content requested by the requesting device, on the vehicle, and ask it to slow down for a few seconds within the vicinity of the requesting device. This could be relevant in a rural area, were both conditions (i.e. less cars and helping neighbors) is more common. For a smart connected vehicle, it could tell the driver that the owner of the requesting device will appreciate it if she slows down the car when in the vicinity of the requesting device. Notice that this is true for delivering or receiving to/from the requesting device. However, for uploading the data on the vehicle to begin with (or downloading), this could be done in multiple ways (or combining them). In one embodiment, the car will upload in multiple 5G stations loading more this way. For example, in the first station it loads D, in the second D' and now it has DD'. In another embodiment, the car will upload both from 5G station and from other mobile nodes. For example, car A and B move next to 5G station X. Station X downloads to vehicle A data D, and to vehicle B data D'. After they move away from X continuing in the same direction B delivers D' to A so now A has DD' which it can upload to the requesting device.

Figure 4:
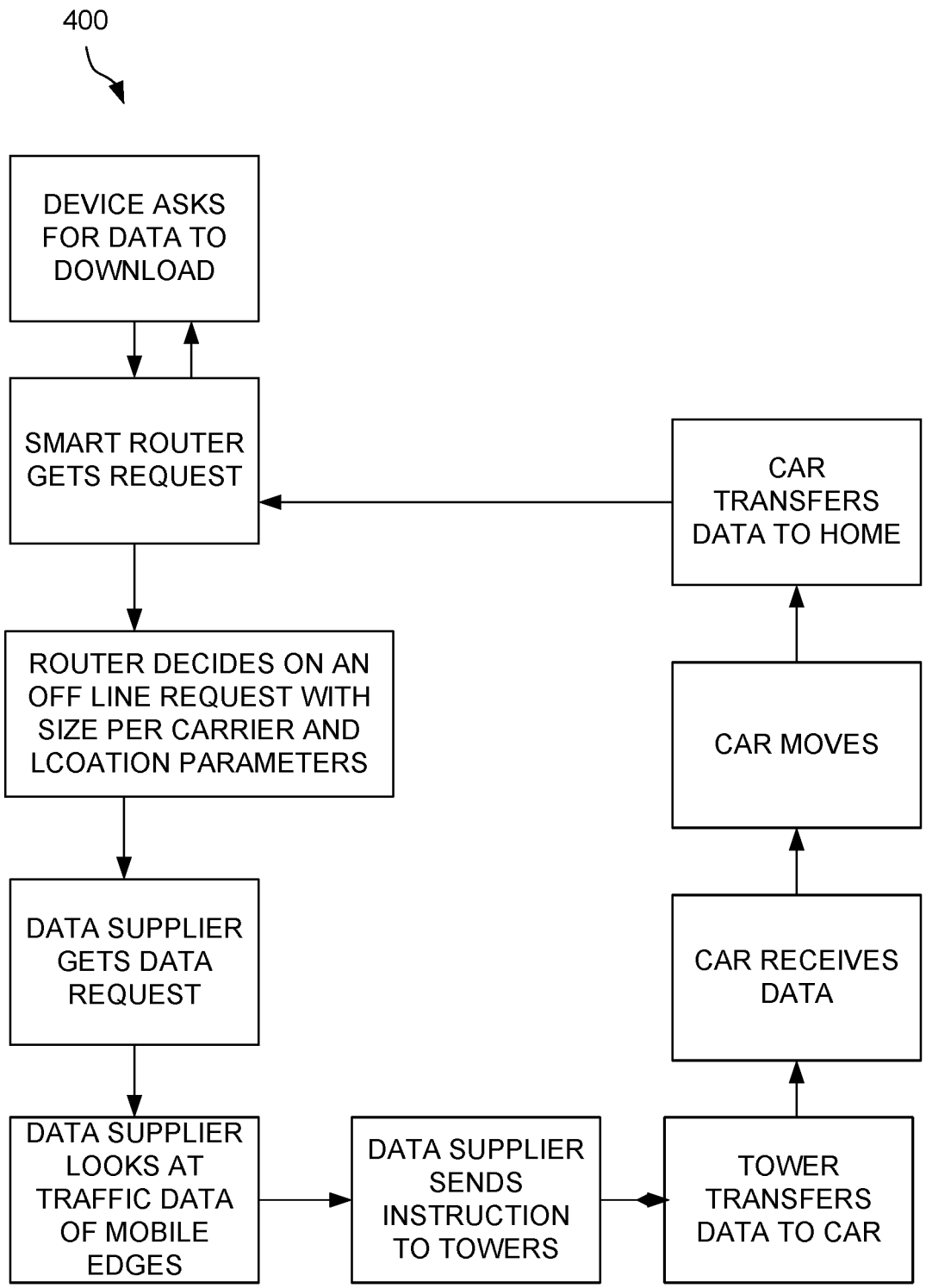
FIG. 4 illustrates a block diagram of a flow to use moving network connected vehicles to deliver digital content to a requesting device, in accordance with one embodiment.

FIG. 4 illustrates a block diagram of a flow 400 to use moving network connected vehicles to deliver digital content to a requesting device, in accordance with one embodiment. As an option, the flow 400 may be carried out in the context of the details of the previous figure and/or any subsequent figure(s). Of course, however, the flow 400 may be carried out in the context of any desired environment. Further, the aforementioned definitions may equally apply to the description below.

As shown, a device (or user thereof) requests digital content (data) to download. The device sends the request to a smart router (i.e. residential router). The smart router decides to ask for the data in an offline way. It asks for the digital content and indicates how much can be downloaded by one moving edge (connected vehicle). The data supplier (i.e. vehicle coordination system) gets the request, and looks at traffic data to finds a network tower in which to send it through, including size and destination information.

A network tower gets the request and the additional information and determines which mobile edge to give it to. The tower transfers the digital content and the additional information to the mobile edge. The mobile edge moves, and when the mobile edge is in the right location it transfers the digital content to the smart router after checking it is the right destination (using a validation protocol). The smart router may stich the data or may transfer it as is to the device.

It is possible that multiple mobile edges will be needed in which case the process will be the same with the following modifications.

1) A device (say a phone, or a computer) wants a large file like a movie.

2) It asks the smart router for it.

3) The smart router decides to ask for it in offline way. It asks for the movie and indicates how much can be downloaded by one moving edge (connected vehicle).

4) The data supplier gets the request.

5) The data supplier divides the requests to multiple requests (as one transfer is not enough).

6) For each request of the multiple requests:

a) The data supplier looks at traffic data, and finds a tower in which to send it through, this includes size and destination information.

b) A tower gets the data and additional information and decides which mobile edge to give it to.

c) The tower transfers the data to the mobile edge.

d) The mobile edge moves.

e) When the mobile edge is in the right location it transfer the data to the smart router after checking it is the right destination (using a validation protocol).

f) The smart router may stich the data or may transfer it as is to the device.

Figure 5:
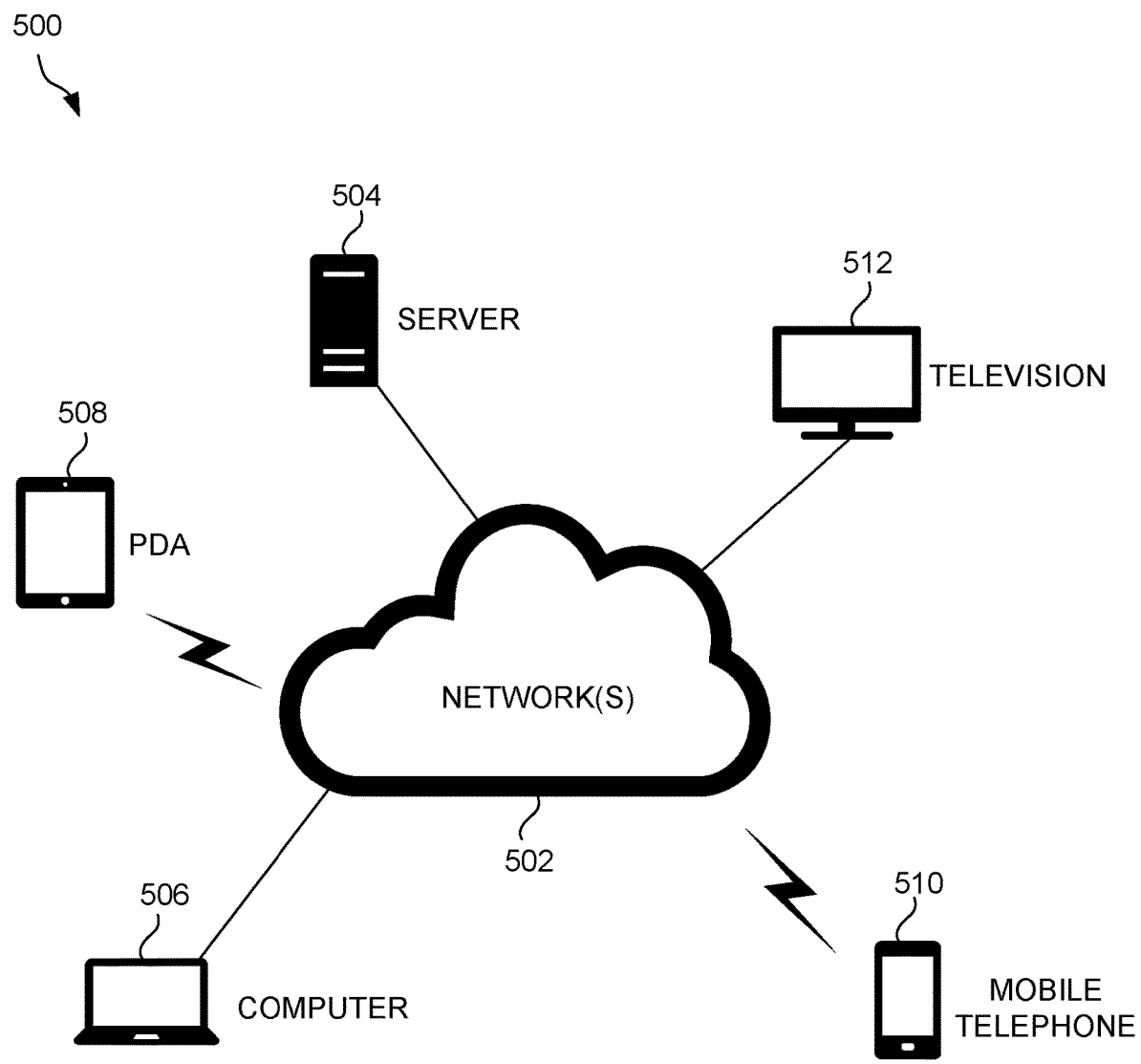
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
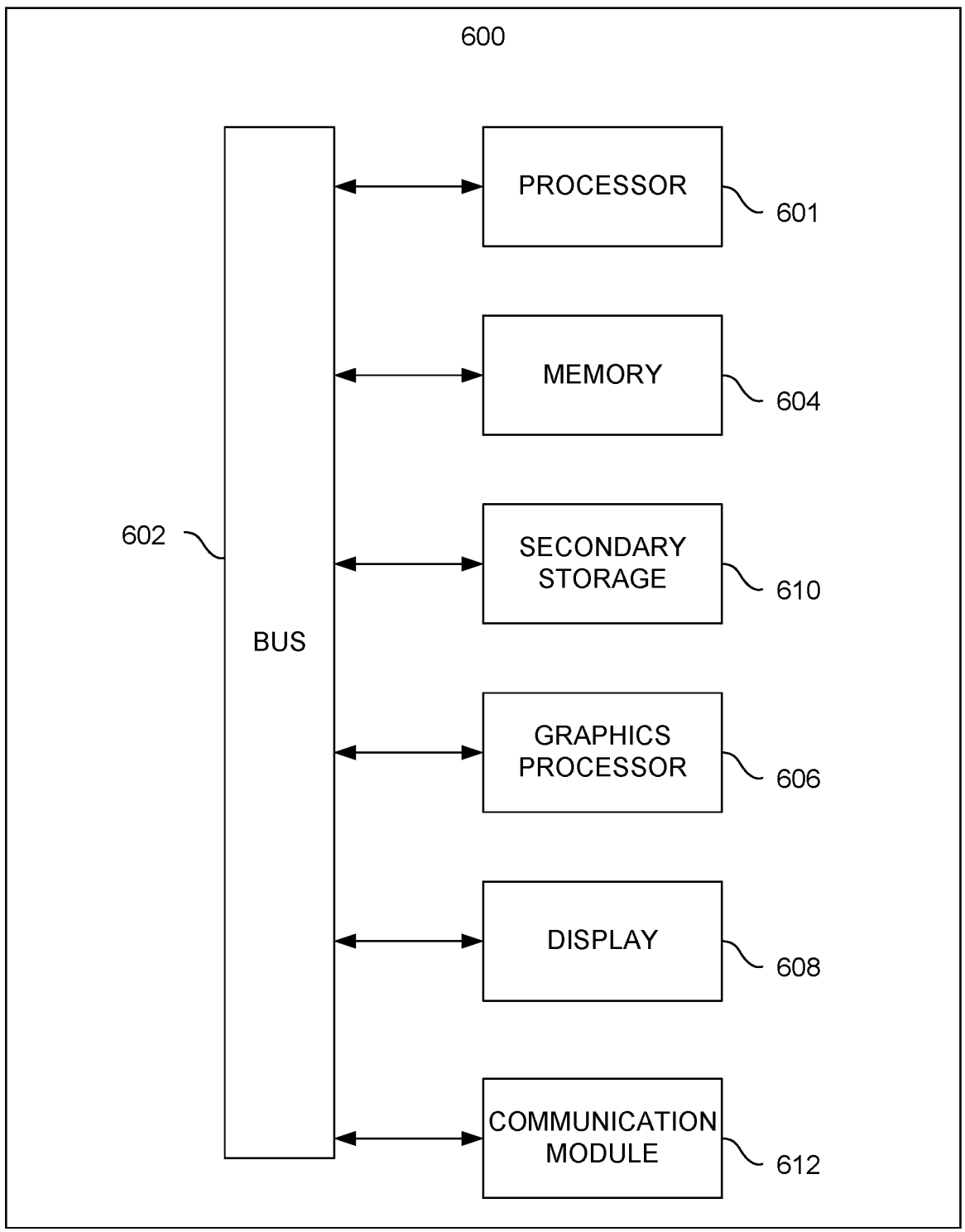
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
    receiving, by a system, a request for non-operational digital content to be provided to a requesting device, the requesting device being a residential network router or a mobile device of a user;
    responsive to the request, determining, by the system, one or more moving network connected vehicles available to obtain the digital content when moving in an area covered by a network and to provide the digital content to the requesting device when moving in an area within a communication range of the requesting device, wherein the determining includes:
    determining, by the system, an estimate for each moving network connected vehicle of the plurality of moving network connected vehicles of a size of data capable of being transmitted by the moving network connected vehicle to the requesting device when moving in the area within the communication range of the requesting device, wherein the estimate is based on a communication speed of the moving network connected vehicle, a communication speed of the requesting device, and a time duration in which the moving network connected vehicle is expected to be moving in the area within the communication range of the requesting device, and
    evaluating, by the system, the estimates received from the plurality of moving network connected vehicles to select the one or more moving network connected vehicles from the plurality of moving network connected vehicles,
    wherein the one or more moving network connected vehicles obtain respective portions of the digital content from a digital content source via a plurality of different network stations providing network coverage within a current location of the one or more moving network connected vehicles; and
    causing, by the system, the one or more moving network connected vehicles to obtain the digital content when moving in the area covered by the network and to provide the digital content directly to the requesting device when moving in the area within the communication range of the requesting device at a later time,
    wherein the area covered by the network and the area within the communication range of the requesting device are different;
    wherein the requesting device is a residential router with multiple connected consumers and with a connection to the network or an additional network, and wherein the residential router prioritizes usage of the network or the additional network to a first one of the connected consumers making a request with a latency requirement, and wherein the residential router uses the one or more moving network connected vehicles to satisfy a request of a second one of the connected consumers for the non-operational digital content in accordance with a broadband requirement.

2. The non-transitory computer readable medium of claim 1, wherein the request is received from the requesting device.

3. The non-transitory computer readable medium of claim 1, wherein the request indicates a location of the requesting device.

4. The non-transitory computer readable medium of claim 1, wherein the determining one or more moving network connected vehicles includes:
    using a navigation system to detect a plurality of moving network connected vehicles destined to be located within the area covered by the network and later within the area within the communication range of the requesting device.

5. The non-transitory computer readable medium of claim 4, wherein the plurality of moving network connected vehicles are destined to be located within the area covered by the network within a first defined time period and to be located within the area within the communication range of the requesting device during a later defined time period.

6. The non-transitory computer readable medium of claim 4, wherein the determining one or more moving network connected vehicles further includes:
    making an agreement with the one or more moving network connected vehicles of the plurality of moving network connected vehicles to provide the digital content to the requesting device when moving in the area within the communication range of the requesting device.

7. The non-transitory computer readable medium of claim 1, wherein the one or more moving network connected vehicles is a single moving network connected vehicle.

8. The non-transitory computer readable medium of claim 7, wherein causing the single moving network connected vehicle to obtain the digital content when moving in the area covered by the network and to provide the digital content to the requesting device when moving in the area within the communication range of the requesting device includes:
    causing the single moving network connected vehicle to obtain an entirety of the digital content from the digital content source and to provide the entirety of the digital content to the requesting device when moving in the area within the communication range of the requesting device.

9. The non-transitory computer readable medium of claim 1, wherein the one or more moving network connected vehicles is two or more moving network connected vehicles.

10. The non-transitory computer readable medium of claim 9, wherein causing the two or more moving network connected vehicles to obtain the digital content when moving in the area covered by the network and to provide the digital content to the requesting device when moving in the area within the communication range of the requesting device includes:

causing each moving network connected vehicle of the two or more moving network connected vehicles to obtain a respective portion of the digital content from the digital content source and to provide the respective portion of the digital content to the requesting device.

11. The non-transitory computer readable medium of claim 10, wherein the requesting device stitches together each respective portion of the digital content received from the two or more moving network connected vehicles.

12. The non-transitory computer readable medium of claim 1, wherein causing the one or more moving network connected vehicles to obtain the digital content when moving in the area covered by the network and to provide the digital content to the requesting device when moving in the area within the communication range of the requesting device includes:

instructing the one or more moving network connected vehicles to move at a speed that allows the one or more moving network connected vehicles to be within the area within the communication range of the requesting device for a period of time required to transmit the digital content to the requesting device.

13. The non-transitory computer readable medium of claim 1, wherein causing, by the system, the one or more moving network connected vehicles to obtain the digital content when moving in the area covered by the network includes one of:

causing the one or more moving network connected vehicles to retrieve the digital content from the digital content source when moving in the area covered by the network, or causing the network to provide the digital content from the digital content source to the one or more moving network connected vehicles when moving in the area covered by the network.

14. The non-transitory computer readable medium of claim 1, wherein the estimate is computed by:

determining a minimum communication speed from among the communication speed of the moving network connected vehicle and the communication speed of the requesting device, and multiplying the minimum communication speed by the time duration in which the moving network connected vehicle is expected to be moving in the area within the communication range of the requesting device.

15. A method, comprising:

receiving, by a system, a request for non-operational digital content to be provided to a requesting device, the requesting device being a residential network router or a mobile device of a user;

responsive to the request, determining, by the system, one or more moving network connected vehicles available to obtain the digital content when moving in an area covered by a network and to provide the digital content to the requesting device when moving in an area within a communication range of the requesting device, wherein the determining includes:

determining, by the system, an estimate for each moving network connected vehicle of the plurality of moving network connected vehicles of a size of data capable of being transmitted by the moving network connected vehicle to the requesting device when moving in the area within the communication range of the requesting device, wherein the estimate is based on a communication speed of the moving network connected vehicle, a communication speed of the requesting device, and a time duration in which the moving network connected vehicle is expected to be moving in the area within the communication range of the requesting device, and evaluating, by the system, the estimates received from the plurality of moving network connected vehicles to select the one or more moving network connected vehicles from the plurality of moving network connected vehicles, wherein the one or more moving network connected vehicles obtain respective portions of the digital content from a digital content source via a plurality of different network stations providing network coverage within a current location of the one or more moving network connected vehicles; and causing, by the system, the one or more moving network connected vehicles to obtain the digital content when moving in the area covered by the network and to provide the digital content directly to the requesting device when moving in the area within the communication range of the requesting device at a later time, wherein the area covered by the network and the area within the communication range of the requesting device are different;

wherein the requesting device is a residential router with multiple connected consumers and with a connection to the network or an additional network, and wherein the residential router prioritizes usage of the network or the additional network to a first one of the connected consumers making a request with a latency requirement, and wherein the residential router uses the one or more moving network connected vehicles to satisfy a request of a second one of the connected consumers for the non-operational digital content in accordance with a broadband requirement.

16. A system, comprising:

a non-transitory memory storing instructions; and one or more processors in communication with the non-transitory memory that execute the instructions to perform a method comprising:

receiving a request for non-operational digital content to be provided to a requesting device, the requesting device being a residential network router or a mobile device of a user;

responsive to the request, determining one or more moving network connected vehicles available to obtain the digital content when moving in an area covered by a network and to provide the digital content to the requesting device when moving in an area within a communication range of the requesting device, wherein the determining includes:

determining an estimate for each moving network connected vehicle of the plurality of moving network connected vehicles of a size of data capable of being transmitted by the moving network connected vehicle to the requesting device when moving in the area within the communication range of the requesting device, wherein the estimate is based on a communication speed of the moving network connected vehicle, a communication speed of the requesting device, and a time duration in which the moving network connected vehicle is expected to be moving in the area within the communication range of the requesting device, and evaluating the estimates received from the plurality of moving network connected vehicles to select the one or more moving network connected vehicles from the plurality of moving network connected vehicles, wherein the one or more moving network connected vehicles obtain respective portions of the digital content from a digital content source via a plurality of different network stations providing network coverage within a current location of the one or more moving network connected vehicles; and causing the one or more moving network connected vehicles to obtain the digital content when moving in the rea covered by the network and to provide the digital content directly to the requesting device when moving in the area within the communication range of the requesting device at a later time, wherein the area covered by the network and the area within the communication range of the requesting device are different;

wherein the requesting device is a residential router with multiple connected consumers and with a connection to the network or an additional network, and wherein the residential router prioritizes usage of the network or the additional network to a first one of the connected consumers making a request with a latency requirement, and wherein the residential router uses the one or more moving network connected vehicles to satisfy a request of a second one of the connected consumers for the non-operational digital content in accordance with a broadband requirement.

\* \* \* \* \*